Aug. 8, 1967     N. T. NEAPOLITAKIS     3,335,352
WINDSHIELD WIPER CONTROL
Filed May 22, 1964
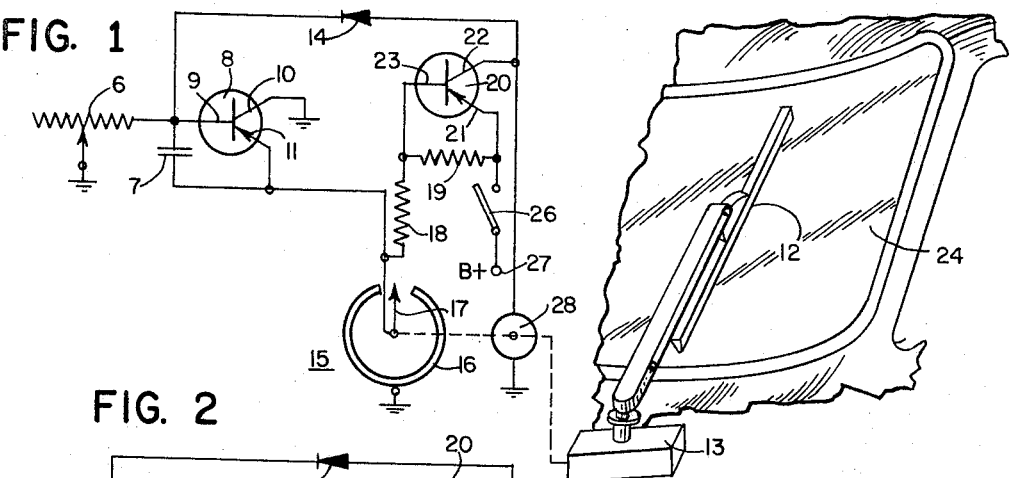
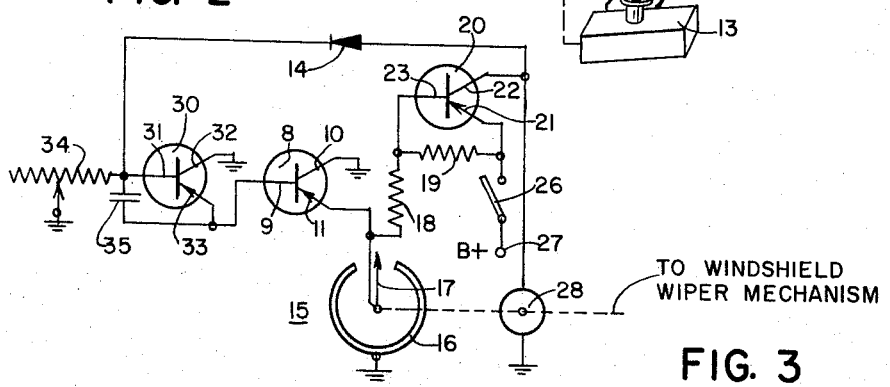
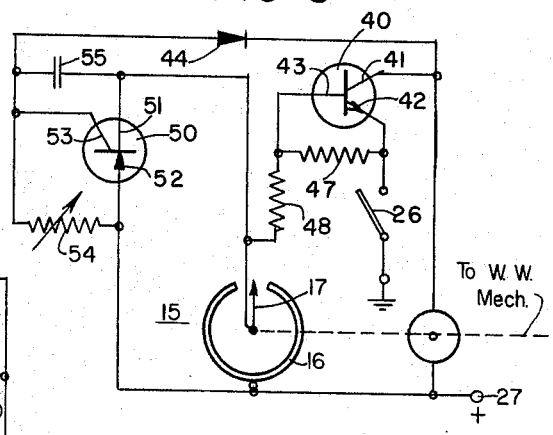
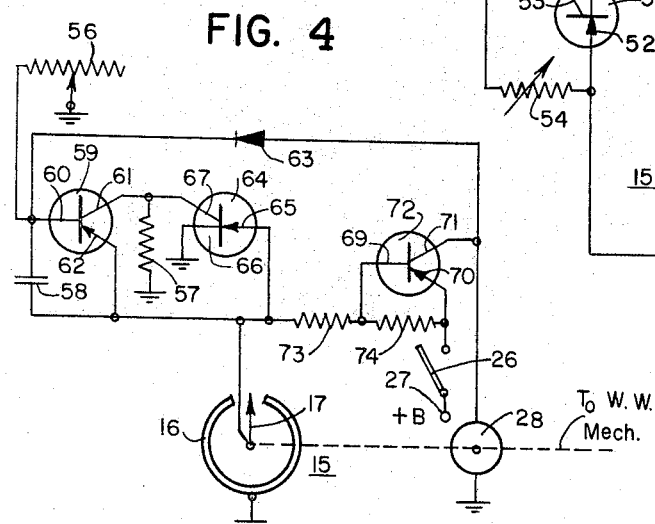
INVENTOR.
Nicholas T. Neapolitakis
BY Mueller & Aichele
ATTYS.

United States Patent Office 3,335,352
Patented Aug. 8, 1967

3,335,352
WINDSHIELD WIPER CONTROL
Nicholas Theodore Neapolitakis, Chicago, Ill., assignor to Motorola, Inc., Franklin Park, Ill., a corporation of Illinois
Filed May 22, 1964, Ser. No. 369,399
3 Claims. (Cl. 318—443)

This invention relates to an improved control system for intermittent operation of an electrical device and it is more particularly directed to such an improved control system which is constructed to impart a controllable intermittent drive to a windshield wiper.

To observe an intermittently operated instrumentality continuously repeat its operation is annoying and tiring to the observer. For this reason windshield wipers although performing an important and necessary function have often been a source of annoyance and irritation to the car driver. It is usual for windshield wipers in most motor vehicles to be reciprocally driven in a continuous arcuate manner. It is also usual for the prior art windshield wipers to be driven at a constant speed because of the relatively high cost of variable speed drive motors. In cases where intermittently operated drive motors have been used, the motors have not been able to develop their full starting torque at the beginning of each cycle of operation because of the relatively slow turn on action of the intermittently operated switches used.

It is therefore an object of the present invention to provide an improved electronic control for use in conjunction with an electric device which enables the device to be energized in an intermittent manner with the intermittent rate of operation being controllable.

Another object of the invention is to provide such an improved electronic control which can readily be adapted to and incorporated into the existent motor types of windshield wiper drive assemblies.

Another object of this invention is to provide an improved electronic control for use with an electric motor which enables the motor to be energized in an intermittent manner and to develop full starting torque at each energization.

A feature of this invention is the provision of an electronic control system for intermittent operation of an electric device including a semiconductor switching device which controls the rate of operation of the control system.

Another feature of the invention is the provision of an electronic control system for intermittent operation of an electric motor including a semiconductor switching device in circuit with the drive motor of a windshield wiper or similar instrumentality and which intermittently makes and breaks the energization circuit to the drive motor at a controllable rate and in a manner to permit the drive motor to develop full starting torque to provide the desired intermittent control of the windshield wiper.

It is to be understood that although the improved control of the present invention has important utility in the drive mechanism of windshield wiper blades and the like and for that reason will be described in such an environment, the invention finds utility wherever it is desired to energize an instrumentality at a controllable intermittent rate.

The invention is illustrated in the drawings wherein:

FIG. 1 is a schematic diagram of a system incorporating a thyristor and used to control the operation of the windshield wiper of a motor vehicle;

FIG. 2 is a schematic diagram of another embodiment of the circuit shown in FIG. 1;

FIG. 3 is a schematic diagram of a system incorporating a silicon controlled rectifier and used to control the operation of a windshield wiper of a motor vehicle; and FIG. 4 is a schematic diagram of another embodiment of the circuit shown in FIG. 3.

In practicing the invention a motor or other electrical device is coupled to a power supply through a transistor, which is coupled to a mechanical switch and a semiconductor switching device such as a thyristor or a silicon controlled rectifier (SCR). A semiconductor switching edvice is characterized by self regenerative action which causes the device to switch rapidly from a nonconductive to a conductive state.

When the power supply to the circuit is turned on, the semiconductor switching device operates to turn on the transistor thus connecting a motor or other electrical device to the power supply. The rapid switching action of the semiconductor switching device causes the transistor to apply full power to the motor before it starts thus enabling the motor to develop its full starting torque. Upon initial rotation the motor closes the mechanical switch to maintain the transistor fully turned on independently of the operation of the semiconductor switching device. At the end of one cycle of operation the mechanical switch opens and the motor will not operate again until the transistor is again turned on by the semiconductor switching device.

The circuit of the semiconductor switching device includes a capacitor across which a bias potential is developed when the mechanical switch is closed. This voltage biases the semiconductor switching device to cut off to prevent it from triggering the transistor switch after the mechanical switch opens. The semiconductor switching device remains cut off until the potential across the capacitor decays to a value such that the bias potential applied to the semiconductor switching device causes it to turn on.

A schematic of one embodiment of this invention incorporating a thyristor as the semiconductor switching device is shown in FIG. 1. The thyristor is a transistor having a thyratron like characteristic. As the collector current is increased above a critical value the thyristor regenerates and is rapidly switched to a high conductance stable state.

Initially, with switch 26 opened the base 9 of thyristor 8 is at ground potential and the thyristor is biased off. When switch 26 is closed, a positive potential is applied to the emitter 11 of thyristor 8, through resistors 19 and 18. With the application of the positive potential to the emitter 11, thyristor 8 is biased in the forward direction and rapidly swiches to a fully conductive state. Current flows through thyristor 8 from emitter 11 to collector 10 to ground and produces a voltage drop across resistor 19 which biases transistor 20 to saturation. With transistor 20 biased on, energy is supplied to motor 28 causing the motor to rotate. The switching action of thyristor 8 which results in transistor 20 being biased to saturation immediately enables motor 28 to develop its full starting torque.

Motor 28 may operate mechanism 13 for driving windshield wiper 12 and is mechanically coupled to switch 15 for actuating the same. As motor 28 rotates, switch arm 17 of switch 15 engages contact 16 which is grounded. The emitter 11 of thyristor 8 is thus connected to ground causing the thyristor to be biased off. The flow of current through resistors 19 and 18 and switch 15 to ground maintains transistor 20 in a saturated condition, so that motor 28 will continue to rotate. Motor 28 and switch arm 17 rotate until switch arm 17 is removed from contact with contact 16 at the completion of one cycle of operation of motor 28 and the mechanism attached thereto. When this occurs the current flow through resistors 19 and 18 ceases and transistor 20 is biased off, stopping the motor. Thus the motor, when started by thyristor 8, will complete one cycle of operation and stop until again started by the action of thyristor 8. During the cycle of operation windshield wiper 12, driven by the wiper mechanism 13, will move back and forth across the windshield 24.

When transistor 20 is biased fully on the potential at the collector 22 rises to a value nearly equal to the B+ potential applied to terminal 27. This potential is coupled to base 9 of thyristor 8 and to one terminal of capacitor 7 through diode 14. The other terminal of capacitor 7 is connected to ground potential through switch 15. Thus for the duration of the cycle, during which transistor 20 is biased to saturation, capacitor 7 charges to a value very nearly equal to the B+ potential applied to terminal 27. Upon the completion of one cycle the potential of collector 22 of transistor 20 falls to a potential near ground causing diode 14 to be biased in the reverse direction. The potential across capacitor 7 biases the base 9 of thyristor 8 positive with respect to the emitter 11. With the switch arm 17 of switch 15 removed from ground potential at the end of the cycle the emitter 11 of thyristor 8 will be biased to approximately the B+ potential. Because of the potential across capacitor 7 the base 9 of thyristor 8 is biased to a potential approximately twice the B+ potential. Thus thyristor 8 is biased off. The discharge path for the potential across capacitor 7 is through resistor 6 to ground. After an interval of time, determined by the time constant of discharge path, the potential across capacitor 7 falls to a value where thyristor 8 is again biased in the forward direction and becomes conductive, initiating the cycle of operation previously described. Thus motor 28 operates at full speed for one cycle of operation and then rests for a predetermined time before commencing another cycle of operation. The variable resistor 6 determines the interval between the cycles of operation. The switching action of thyristor 8 causes transistor 20 to be rapidly biased to fully conducting condition enabling the motor 28 to develop full starting torque.

A second form of this device, which can be used when a thyristor does not have sufficient current gain to operate a transistor switch directly, is shown in FIG. 2. Elements of FIG. 2 which correspond to FIG. 1 have the same identifying numerals. A second transistor 30 is used to amplify the current applied to the base 9 of thyristor 8. When switch 26 is closed a B+ potential is applied to the emitter 33 of transistor 30 through resistors 19, 18, and thyristor 8. The base 31 of transistor 30 is at ground potential through resistor 34. The B+ potential on the emitter 33 biases transistor 30 to conduction so that current flows through the emitter 33 and collector 32 to ground. The potential at the emitter 33 falls to a value close to ground biasing thyristor 8 to conduction. The current flow through thyristor 8 and resistor 19 biases transistor 20 to conduction causing motor 28 and switch 15 to operate as described previously. At the end of a cycle, switch 15 disconnects emitter 11 of thyristor 8 from ground stopping the action of motor 28. During the time that transistor 20 is biased on the potential of collector 22 is nearly equal to the B+ potential. This causes capacitor 35 to charge to nearly the B+ potential through diode 14 as described for capacitor 7 of FIG. 1. Upon the removal of ground potential from emitter 11 of thyristor 8, by the opening of switch 15, the potential on emitter 33 of transistor 30 rises to near B+. The voltage on the base 31, however, is more positive than the voltage on the emitter 33 because of the charge on capacitor 35 and transistor 30 is biased off. This condition will be maintained until the voltage across capacitor 35 is reduced by discharging through resistor 34 to ground. The time required for the discharge to take place is determined by the time constant of this path which is a function of the value of resistor 34. Resistor 34 is variable so that the time constant of the discharge path can be changed.

Another embodiment of this invention incorporating an SCR as the semiconductor switching device is shown in FIG. 3. Elements of FIG. 3 which are identical to those in FIGS. 1 and 2 have the same identifying numerals.

The SCR blocks current in both the forward and reverse directions until a positive trigger pulse is applied to the control terminal 53. Thereafter the applied voltage produces a forward current which is limited essentially only by the load impedance. Although a positive trigger pulse applied to the control electrode 53 can turn the device on, a reverse anode voltage is required to turn the SCR off.

When SCR 50 is biased in the forward direction by the closure of switch 26 the positive potential from terminal 27 is applied to control electrode 53 through variable resistor 54 thus turning on SCR 50. The current from the power supply terminal 27 flows through the SCR resistors 48 and 47, and switch 26 to ground. The current flow through resistor 47 biases transistor 40 to full conduction. With transistor 40 biased to full conduction energy is supplied to motor 28 causing it to rotate.

The rotation of motor 28 causes switch arm 17 of switch 15 to contact element 16 of the switch which is connected to the positive potential. The flow of current from switch 15 through resistors 48 and 47, switch 26 to ground maintains transistor 40 in a fully on condition for the duration of one cycle until switch 15 opens. During the period when switch 15 is closed transistor 40 is in a fully saturated condition and collector 41 of transistor 40 assumes a potential very close to ground. Current flows from capacitor 55 through diode 44 and transistor 40 to ground causing a voltage to develop across capacitor 55 whereby the control electrode 53 of SCR 50 is negative with respect to the cathode electrode 51. When one cycle is completed and switch 15 again opens, ground potential is applied to the cathode 51 of SCR 50. However, the control electrode 53 biased negatively with respect to cathode electrode 51, because of the voltage across capacitor 55, so that the SCR is biased to a nonconductive condition. The potential across capacitor 55 is discharged through variable resistor 54 to the positive supply terminal 27. The time duration of this discharge is determined by the time constant of the capacitor, resistor network. When capacitor 55 has discharged to the point where the voltage appearing at the control electrode 53 is positive with respect to the voltage appearing at the cathode 51, SCR 50 will be biased on and the cycle described above will repeat itself. Thus the interval between cycles is determined by the time constant of the network consisting of variable resistor 54 and capacitor 55. By adjusting resistor 54 the interval between cycles of motor 28 can be varied.

Another circuit embodying the features of this invention is shown in FIG. 4 in which transistor 59 is used to amplify the control current supplied to the SCR. Elements of FIG. 4 which are identical to those of FIGS. 1, 2 and 3 have the same identifying numerals. When switch 26 is closed, a positive supply potential is applied to emitter 62 of transistor 59 and anode 65 of SCR 64 through resistors 73 and 74 and to the emitter 70 of transistor 72. Transistor 59 is biased on and current flows from the emitter to the collector through resistor 57 to ground. The voltage appearing at the collector 61 rises to a potential near that of the B+ potential applied to terminal 27. This positive potential applied to control electrode 67 of SCR 64 biases the SCR on. Current flows from the terminal 27 through switch 26, resistors 73 and 74, SCR 64 to ground. The current flowing through resistor 74 biases transistor 72 fully on and causes the voltage appearing at the collector 71 to be very nearly equal to the B+ voltage at terminal 27. This voltage is applied to motor 28 causing the motor to operate.

Motor 28 causes the arm 17 of switch 15 to rotate contacting element 16 of the switch which is connected to ground. This applies a ground potential to the anode 65 of SCR 64 causing the SCR to be biased off. The voltage drop resulting from the current flowing through resistor 74 maintains transistor 72 in a fully on condition. A ground potential is also applied to emitter 62 of transistor 59 causing this transistor to be biased off. The positive potential appearing at the collector 71 of transistor 72 is applied through diode 63 to the capacitor 58 charging this capacitor so that the base 60 of transistor 59 is positive with respect to the emitter 62.

When the motor 28 completes one cycle of operation the switch arm 17 is no longer connected to element 16 and current ceases to flow from the terminal 26 through resistor 74. Transistor 72 is biased off causing motor 28 to stop. A positive potential is applied from switch 26 through resistors 73 and 74 to the emitter 62 of transistor 59. Since capacitor 58 is charged so that the base 60 is positive with respect to the emitter 62 transistor 59 is biased off. With transistor 59 biased off the voltage applied to control electrode 67 of SCR 64 from collector 61 of transistor 59 is at ground potential through resistor 57 so that SCR 64 remains biased off. The voltage appearing across capacitor 58 discharges through resistor 56 with a time duration determined by the time constant of this discharge network. When capacitor 58 has discharged to a point where base 60 is again negative with respect to emitter 62, transistor 59 will be biased on. This will cause current to flow through resistor 57 to ground raising the potential of control electrode 67 of SCR 64 triggering the SCR 64 on and causing the cycle described above to repeat.

A simple intermittent switching system has been shown wherein a semiconductor switching device is used to initiate a cycle of operation of an electrical device at predetermined intervals. The use of a semiconductor switching device having a rapid switching action allows the electrical device thus actuated to develop full starting torque.

What is claimed is:

1. A control system for intermittently energizing a cyclically operated windshield wiper drive motor including in combination, power supply means coupled to a reference potential, a transistor having emitter, base and collector electrodes, means coupling said transistor emitter electrode to said power supply means and means coupling said transistor collector electrode to the drive motor, first resistor means connected between said transistor base and emitter electrodes, mechanical switch means mechanically coupled to the motor and electrically coupled to said transistor base electrode and said reference potential, semiconductor switch means including a thyristor having emitter, base and collector electrodes, means connecting said thyristor collector electrode to said reference potential, means coupling said thyristor emitter electrode to said mechanical switch means, capacitor means connected between said thyristor emitter and base electrodes, second resistor means connected between said thyristor base electrode and said reference potential, and diode means connected between said transistor collector electrode and said thyristor base electrode, said diode means, said capacitor means and said second resistor means forming a timing circuit, said first resistor means being responsive to the switching action of said thyristor to develop a bias voltage for said transistor whereby said transistor becomes fully conductive for energizing the motor to render the same operative, said mechanical switch means being responsive to the operation of the motor to maintain said bias potential for one cycle of operation thereof, said diode means being responsive to the potential at said transistor collector electrode with said transistor fully conductive to provide a charging current for charging said capacitor means to prevent said switching action of said thyristor for a predetermined time interval after one cycle of operation whereby the motor is inoperative for said predetermined time interval.

2. A control system for intermittently energizing a cyclically operated windshield wiper drive motor including in combination, power supply means coupled between the motor and a reference potential, a transistor having emitter, base and collector electrodes, means coupling said transistor emitter electrode to said reference potential and means coupling said transistor collector electrode to the drive motor, first resistor means connected between said transistor base and emitter electrodes, mechanical switch means mechanically coupled to the motor and electrically coupled to said base electrode and said reference potential, semiconductor switch means including a silicon controlled rectifier having anode, cathode and control electrodes, means connecting said anode electrode to said power supply means, means coupling said cathode electrode to said mechanical switch means, capacitor means connected between said cathode and control electrodes, second resistor means connected between said control electrode and said power supply means, and diode means connected between said transistor collector electrode and said control electrode, said diode means, said capacitor means and said resistor means forming a timing circuit, said first resistor means being responsive to the switching action of said silicon controlled rectifier to develop a bias voltage for said transistor whereby said transistor becomes fully conductive for energizing the motor to render the same operative, said mechanical switch means being responsive to the operation of the motor to maintain said bias potential for one cycle of operation thereof, said diode means being responsive to the potential at said transistor collector electrode with said transistor fully conductive to provide a charging current for charging said capacitor means to prevent said switching action of said silicon controlled rectifier for a predetermined time interval after one cycle of operation whereby the motor is inoperative for said predetermined time interval.

3. A control system for intermittently energizing a cyclically operated windshield wiper drive motor, including in combination, power supply means coupled to a reference potential, a first transistor having emitter, base and collector electrodes, means coupling said first transistor emitter electrode to said power supply means and means coupling said first transistor collector electrode to the drive motor, first resistor means connected between said first transistor base and emitter electrodes, mechanical switch means mechanically coupled to the motor and electrically coupled to said first transistor base electrode, semiconductor switch means including a silicon controlled rectifier having anode, cathode and control electrodes, means connecting said cathode electrode to the reference potential, means coupling said anode electrode to said mechanical switch means, a second transistor having emitter, base and collector electrodes, capacitor means connected between said second transistor emitter and base electrodes, second resistor means connected between said second transistor base electrode and said reference potential, third resistor means coupled between said second transistor collector electrode and said reference potential, and diode means connected between said first transistor collector electrode and said second transistor base electrode, means coupling said second transistor collector electrode to said control electrode, said diode means, said capacitor means, said second and third resistor means and said second transistor forming a timing circuit, said first resistor means being responsive to the switching action of said silicon controlled rectifier to develop a bias voltage for said first transistor whereby said first transistor becomes fully conductive for energizing the motor to render the same operative, said mechanical switch means being responsive to the operation of the motor to maintain said bias potential for one cycle of operation thereof, said diode means being responsive to the potential at said first transistor collector electrode with said first transistor fully conductive to provide a charging current for charging said capacitor means to prevent said switching action of said silicon controlled rectifier for a predetermined time interval after one cycle of operation whereby the motor is inoperative for said predetermined time interval.

References Cited
UNITED STATES PATENTS

| | | | |
|---|---|---|---|
| 3,219,901 | 11/1965 | Foreman et al. | 318—443 |
| 3,262,042 | 7/1966 | Amos | 318—443 |

ORIS L. RADER, *Primary Examiner.*

J. C. BERENZWEIG, J. J. BAKER, *Assistant Examiners.*